E. J. ROHRBACHER.
HOSE CONNECTION FOR WHEEL TIRES, &c.
APPLICATION FILED FEB. 21, 1908.
928,797.
Patented July 20, 1909.
2 SHEETS—SHEET 1.
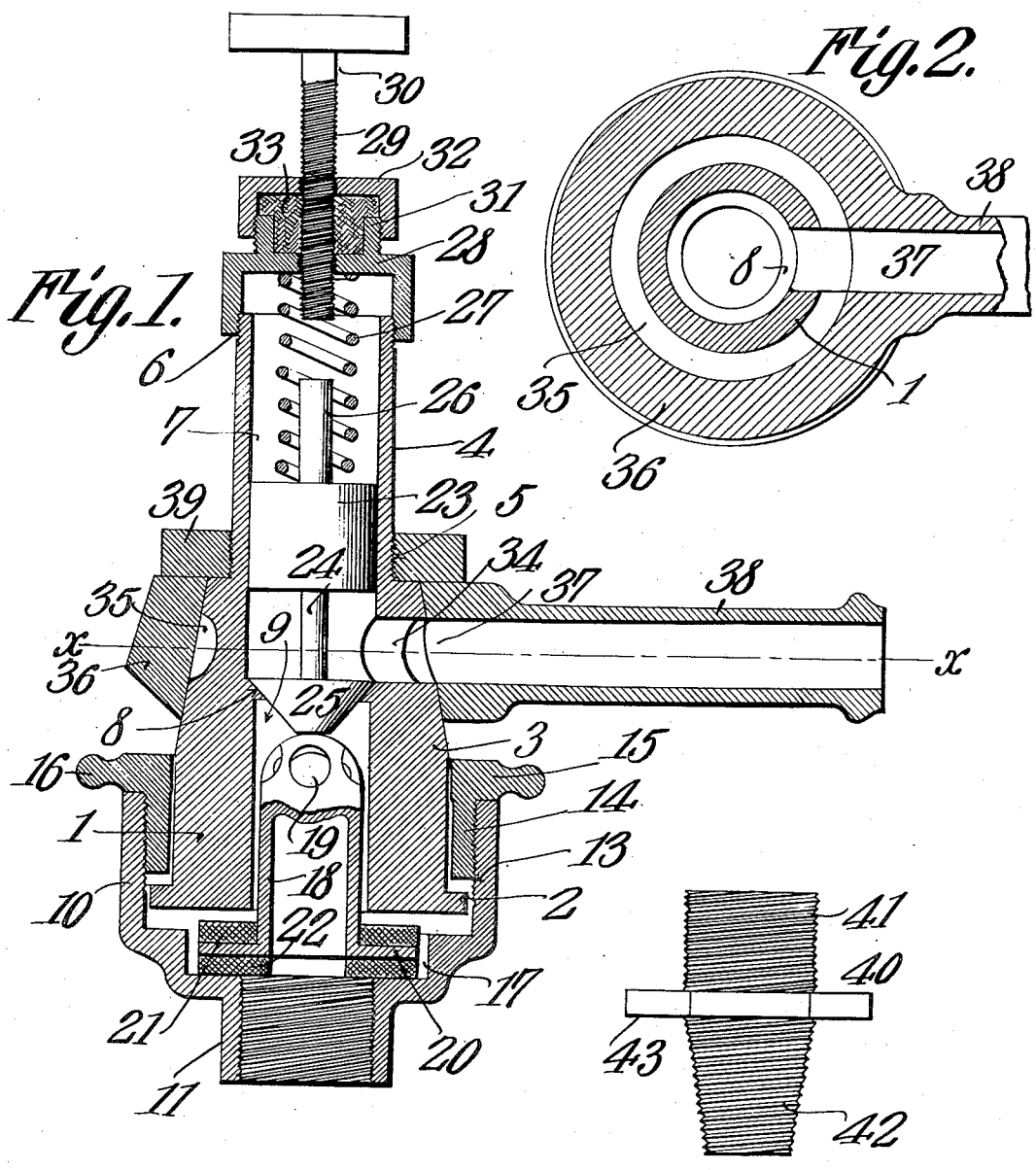
Witnesses
E. F. Stewart
F. T. Chapman
Inventor
Edward J. Rohrbacher.
By C. A. Snow & Co
Attorneys

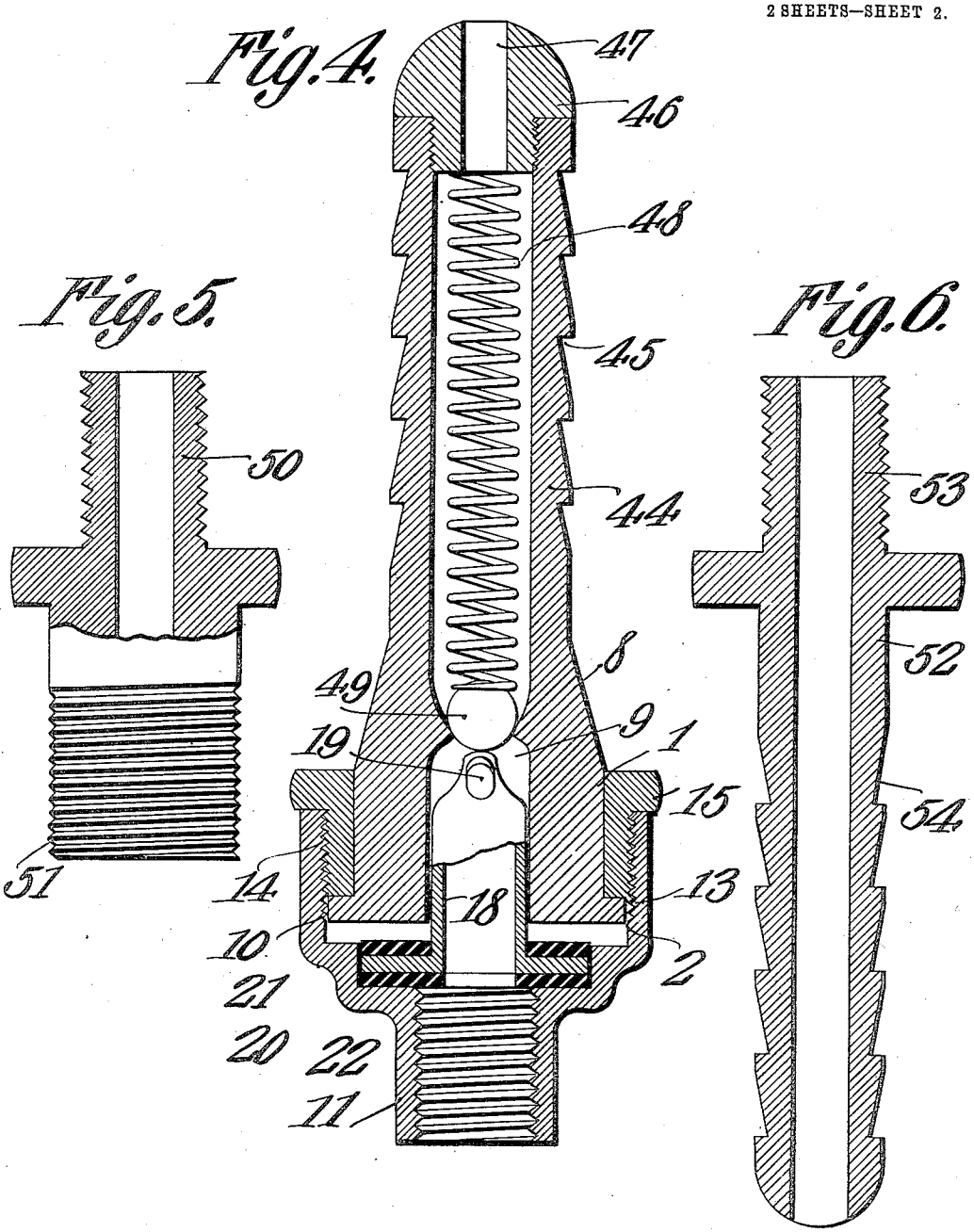

UNITED STATES PATENT OFFICE.

EDWARD J. ROHRBACHER, OF BLAINE, WASHINGTON.

HOSE CONNECTION FOR WHEEL-TIRES, &c.

No. 928,797.  Specification of Letters Patent.  Patented July 20, 1909.

Application filed February 21, 1908. Serial No. 417,094.

*To all whom it may concern:*

Be it known that I, EDWARD J. ROHRBACHER, a citizen of the United States, residing at Blaine, in the county of Whatcom and State of Washington, have invented a new and useful Hose Connection for Wheel-Tires, &c., of which the following is a specification.

This invention has reference to improvements in hose connections for wheel tires for automobiles or bicycles or for any other purpose where air is to be used, and the object of the invention is to provide a hose connection which can be used either as an automatic or as a positive connection.

The invention is designed for the coupling of a source of air supply under pressure to pneumatic tires or other receptacles for compressed air which will permit of the passage of compressed air only after the coupling or connection has been screwed properly to the part through which the air is to be forced.

The improved coupling comprises a valve structure which automatically closes on the air pressure side to the passage of compressed air from the reservoir or compressor to the part into which the compressed air is to flow until the coupling has been firmly connected to the tire or to any other receptacle into which the air is to be delivered.

The invention not only comprises an automatic connection but includes means whereby the valve in the connection may be held positively closed until the connector is coupled to the receptacle into which the compressed air is to flow, after which the intermediate valve may be released.

The invention will be best understood by a consideration of the following detail description taken in connection with the accompanying drawings forming part of this specification, in which drawings—

Figure 1 is a central longitudinal section of the improved hose connection, with parts shown in elevation. Fig. 2 is a cross section on the line x—x of Fig. 1. Fig. 3 is a detail view of an adapter which may be used in connection with the structure of Figs. 1 and 3. Fig. 4 is a longitudinal central section through a hose connection constructed in accordance with the invention, but differing in some particulars from the showing of Fig. 1. Figs. 5 and 6 are detail views of other forms of adapters than that shown in Fig. 3.

Considering the hose connector as being used upon a pneumatic tire for an automobile or bicycle wheel, the showing in the drawing is exaggerated in size, but for other purposes the showing of the drawing is more nearly correct. It is to be understood that the size of the structure will depend entirely upon the use to which it is applied. Therefore the showing of the drawing is to be taken as indicative only without reference to size or proportions, which may be changed as may be necessary to adapt the structure to various uses to which it may be applied.

Referring to the drawings, there is shown in Fig. 1 a cylindrical block 1 formed at its lower end with a laterally extending annular flange 2. The upper portion of the main body of the block is frusto-conical, as indicated at 3, and finally terminates in a cylindrical neck 4, threaded at the end where it joins the frusto-conical section of the block, as indicated at 5, and also at the free end of the sleeve, as indicated at 6. There is formed in the interior of the sleeve 4 a cylindrical chamber 7 extending to a point about midway of the length of the frusto-conical portion 3 where there is formed an inwardly-directed taper-faced annular flange 8 constituting a valve seat, and below this portion the interior chamber is of less diameter, as indicated at 9. The chamber 9 extends to and opens at the flange end of the block 1. Surrounding the main cylindrical portion of the block 1 is a cup 10 having its lower end reduced into an axial neck 11 constituting a screw socket for the reception of a suitable nipple. The interior of the cup 10 is screw-threaded, as indicated at 13, to receive a bushing 14 having the end exterior to the cup 10 expanded to the diameter of the cup, as indicated at 15, and this portion 15 is provided with radial outwardly-extending knobs 16 similar to the contour of an ordinary valve wheel handle. Above the neck 11 the cup 10 is formed with an annular recess 17 opening into the larger portion 10 of the cup.

Within the chamber 9 there is located a hollow cylindrical stem 18 rounded or similarly shaped at one end and there provided with through passages 19 below the apex of the rounded end. The other end of the cylinder 18 is freely opened and is formed with an exterior annular radial flange 20. Surrounding the cylinder 18 on the corresponding side of the flange is a washer 21 and on the other side of the flange is another washer 22. The washers 21 and 22 may be made of leather or other suitable material and may be fastened to the flange 20 in any suitable manner. Within the neck 4 there is contained a cylindrical block 23 on one side of which projects a valve stem 24 terminating in a conical valve head 25 adapted to the seat 8. Extending from the end of the block 23 remote from the valve stem 24 is another stem 26 forming a guiding member for one end of a helical spring 27 housed in the neck 4 and engaging at the end remote from the block 23 against a cap 28 screwed onto the threaded end 6 of the neck 4. The cap 28 has a central perforated passage for the threaded end 29 of a thumb screw 30 arranged axially to the stem 26. The cap 28 is formed with an annular neck 31 exteriorly threaded for the reception of a packing nut 32 confining suitable packing 33 around the threaded end 29 of the thumb screw within the neck 31.

The chamber 7 about midway of the length of the frusto-conical portion 3 of the block 1 is formed with a side port 34, and coincident to this port the frusto-conical portion 3 has an exterior annular groove 35. Fitted to the frusto-conical portion 3 of the block 1 is a collar 36 having its internal bore adapted to snugly fit the conical surface of the section 3 of the block 1. This collar is formed with a port 37 leading into a nipple 38 shaped to receive the end of a piece of hose or other flexible conductor. The collar 36 is held in place about the frusto-conical section 3 by a nut 39 adapted to the threaded portion 5 of the neck 4, and the construction is such that with properly ground joints between the frusto-conical portion 3 and the interior of the collar 36 the connection between the collar 36 and the part carrying the same may be made and maintained air tight, the nut 39 being so arranged as to take up wear.

The threaded neck 11 is adapted to be screwed onto the threaded nipple of a pneumatic tire or other structure into which air is to be introduced. To adapt the structure for application to screw sockets instead of nipples, there is provided a coupling 40, shown in Fig. 3, having a threaded end 41 adapted to the neck 11 and another tapering threaded end 42 arranged to fit the sockets of different sizes. Between the two parts 40 and 41 the coupling is provided with a polygonal flange 43 by means of which the said coupling may be screwed into the part to which it is adapted.

Let it be assumed that the nipple 38 has applied thereto the end of a flexible hose coming from a supply of air under pressure. Under these conditions the air pressure will tend to firmly seat the valve 25 in the seat 8, this valve being normally seated by the action of the spring 27. The valve head 25 is of conical shape with its apex slightly flattened and normally engaging the rounded end of the cylinder or stem 18. Air is thus prevented from passing from the nipple 38 to the neck 11, it being understood that the valve seat 8 and valve head 25 are properly fitted to prevent the normal passage of air. If, now, the neck 11 be screwed onto a suitable nipple, say that on the free end of the stem of a pneumatic tire, this nipple will extend into and through the neck 11 and its free end will engage the washer 22 and force the stem 18 against the valve head 25 and move the latter against the action of the spring 27 until the washer 21 is finally in engagement with the flanged end of the block 1 with the free end of the nipple of the tire valve in firm engagement with the washer 22 and force the stem 18 against the valve head 25 and move the latter against the action of the spring 27 until the washer 21 is finally in engagement with the flanged end of the block 1 with the free end of the nipple of the tire in firm engagement with the washer 22. Air will now flow through the port 34 and by the valve 25 into the chamber 9, and thence through the openings 19 into the interior of the stem 18 and ultimately into the tire or other receptacle. The two washers 21 and 22 form air tight joints between the corresponding end of the block 1 and the nipple end of the valve stem of the tire so that no packing is required other than these two washers 21 and 22. The neck 11 is easily screwed upon the nipple end of the valve stem of the tire because of the projections 16 by means of which the cup 10 is easily rotated upon the block 1, this cup being normally in quite loose engagement with said block.

The hose-receiving nipple 38 is capable of being rotated with the collar 36 entirely around the end 3 of the block 1 and the groove 35 admits air to the port 34 irrespective of whether the port 37 of the nipple 38 is in line with the port 34 or not.

By screwing the thumb screw 30 down against the end of the stem 26, the valve connection becomes a positive connection. The valve may be made automatic only by omitting the thumb screw 30, but it is preferable that this valve should be both automatic and positive, as shown in Fig. 1 of the drawings.

In the structure shown in Fig. 4 the block 1 is continued into a neck 44 formed on its outer surface with annular grooves 45 for the reception of a hose. The free end of the neck 44 is tapped to receive the threaded end of a plug 46 through which extends an axial passage 47. The block 46 serves to confine a helical spring 48 within the interior of the neck 44, and this spring engages a ball 49 normally seated on the valve seat 8 which in this instance is properly shaped to receive the ball 49. The stem 18 of the structure of Fig. 4 is like the stem 18 of the structure of Fig. 1, except that its free end, movable into engagement with the ball valve, may be slightly modified in shape to adapt it to engage the ball valve, or this stem may be the same shape as shown in Fig. 1.

The structure of Fig. 4 is designed to receive on the neck 44 a hose coming from a source of air under pressure, while the neck 11 is to be coupled to the valve stem of an automobile tire or any other connection to the chamber into which the air under pressure is to be introduced.

In Figs. 5 and 6 are shown other forms of adapters which may be used in connection with the structures of either Figs. 1 or 4. In Fig. 5 there is shown an adapter 49 having one end 50 threaded to enter the neck 11, while the other end 51 is threaded to enter a threaded socket or coupling of an ordinary pipe, the said end 51 being provided with ordinary pipe threads of suitable size.

In the structure shown in Fig. 6 there is illustrated an adapter 52 having a nipple 53 threaded to enter the neck 11 and a hose-receiving neck 54 on the end opposite the nipple 53 to receive an ordinary hose. The adapter of Fig. 5 is for the purpose of connecting up the structures of either Figs. 1 or 4 to an iron pipe conduit while the adapter of Fig. 6 is designed to connect up the structures of either Figs. 1 or 4 with a hose conduit.

The structure of Fig. 4 is of the automatic type only and the positive connection shown in Fig. 1 is omitted.

While the application of this invention has been limited more particularly to pneumatic tires, it is to be understood that it may be applied to fire sprinkling systems and other purposes where its action may be utilized and the parts will be made large or small and heavy or light in accordance with the particular conditions under which the device is to be used.

What is claimed is:—

1. A hose connection provided with a valve closing in the direction of flow of the fluid, a loose sliding member in operative relation to the valve and operated to move the valve to open position by the coupling to which the connection is applied, and a swivel coupling comprising a cup having one end reduced into an axial neck and the other end provided with an interior screw thread and receiving one end of the body of the hose coupling, and also formed about the neck with an annular recess receiving the corresponding end of the loose sliding member, and an exteriorly threaded bushing entering the interiorly threaded portion of the cup.

2. A hose connection for pneumatic conduits comprising a body portion with a passage through it and provided in said passage with a valve seat, a valve in said passage closing in the same direction as the flow of air through said connection, a loose sliding member unconnected with but in operative relation to the valve and operated to move the valve to the open position by the coupling to which the connection is applied, and a swivel cup confining the loose sliding member to the body portion of the connection and having a free movement in the direction of its longitudinal axis.

3. A hose connection comprising a cylindrical block having an axial chamber formed therein, and also provided with a frusto-conical portion, a valve in the chamber in the block, a valve seat for said valve within said chamber, means for normally closing the valve in the direction of flow of air through the connection, means for opening the valve in opposition to the direction of flow of the air, a rotatable collar fitted to the frusto-conical portion of the block and provided with a hose-receiving nipple, and means for holding said collar on said frusto-conical portion of the block.

4. A hose connection comprising a cylindrical block, a swivel cup carried thereby and provided with an axial threaded neck, said cup having a limited range of free movement in the direction of its longitudinal axis, a valve interior to the block and closing in the direction of flow of air through the block, and a longitudinal movable hollow stem within the block and there confined by the swivel cup, and having one end in operative relation to but unconnected with the valve and the other end adjacent to the threaded neck and there provided with a suitable packing.

5. A hose connection comprising a cylindrical block, a swivel cup carried thereby and provided with an axial threaded neck, a valve interior to the block and closing in the direction of the flow of air through the block, a longitudinally movable hollow stem within the block having one end in operative relation to the valve and the other end adjacent to the threaded neck and there provided with suitable packing, a frusto-conical continuation of the block provided with a cylindrical neck continuation, a collar having a conical inner face fitted to the frusto-conical portion of the block and provided with a port matching the corresponding port through the frusto-conical portion of the block, said collar also having a hose nipple formed thereon, means for holding said collar to the block, and a spring housed in said neck and engaging the valve.

6. A hose connection provided with a valve closing in the direction of the flow of fluid through the connection, means operated by the parts to which the connection is attached for opening the valve, and means for locking the valve against movement in a direction to open the same.

7. A hose connection comprising a body portion, a swivel part on said body portion and terminating in a threaded neck, a movable member in said body portion in the path of a coupling member entering said neck, a valve within the body portion in operative relation to the movable member and closing when moved in a direction toward the movable member, means for admission of fluid under pressure on the side of the valve away from the movable member, a spring tending to seat the valve, and adjustable means movable to lock the valve in its seat.

In testimony that I claim the foregoing as my own, I have hereto affixed my signature in the presence of two witnesses.

EDWARD J. ROHRBACHER.

Witnesses:
HELEN L. McKINNON,
BENJAMIN J. NICKLIN.